(12) United States Patent
Billyard

(10) Patent No.: US 10,410,312 B2
(45) Date of Patent: Sep. 10, 2019

(54) METHOD AND SYSTEM FOR INTERACTIVE GRAPHICS STREAMING

(71) Applicant: ELEKTRAGLIDE LTD, Guildford (GB)

(72) Inventor: Adam Billyard, Sussex (GB)

(73) Assignee: ELEKTRAGLIDE LTD, Guildford (GB)

( * ) Notice: Subject to any disclaimer, the term of this patent is extended or adjusted under 35 U.S.C. 154(b) by 0 days.

(21) Appl. No.: 15/113,176

(22) PCT Filed: Jan. 21, 2015

(86) PCT No.: PCT/GB2015/050128
§ 371 (c)(1),
(2) Date: Jul. 21, 2016

(87) PCT Pub. No.: WO2015/110804
PCT Pub. Date: Jul. 30, 2015

(65) Prior Publication Data
US 2017/0011487 A1      Jan. 12, 2017

Related U.S. Application Data

(60) Provisional application No. 61/929,538, filed on Jan. 21, 2014.

(51) Int. Cl.
*G06T 1/20* (2006.01)
*G06T 9/00* (2006.01)
*G06T 15/00* (2011.01)

(52) U.S. Cl.
CPC .............. *G06T 1/20* (2013.01); *G06T 9/00* (2013.01); *G06T 15/005* (2013.01); *G06T 2200/16* (2013.01)

(58) Field of Classification Search
CPC .......... G06T 15/005; G06T 1/20; G06T 1/60; G06T 2210/61; A63F 2300/66
See application file for complete search history.

(56) References Cited

U.S. PATENT DOCUMENTS

2002/0029285 A1* 3/2002 Collins ................. G06F 3/1454
709/232
2002/0032751 A1* 3/2002 Bharadwaj ............. H04L 29/06
709/218

(Continued)

OTHER PUBLICATIONS

International Search Report for PCT/GB2015/050128, dated Jul. 16, 2015, 2 pages.

*Primary Examiner* — Haixia Du
(74) *Attorney, Agent, or Firm* — Nixon & Vanderhye P.C.

(57) ABSTRACT

The present invention relates to a method of streaming interactive computer graphics from a server to a client device. The method includes the steps of: intercepting graphics instructions transmitted from an application destined for a graphical processing unit (GPU) at the server; processing the graphics instructions to generate graphics data at the server; generating index information for, at least, some of the graphics data at the server; transmitting the index information in place of the graphics data to a client device; extracting corresponding graphics data stored at the client device utilizing the index information; and rendering computer graphics at a graphical processing unit (GPU) at the client device using the corresponding graphics data. A system for streaming interactive computer graphics is also disclosed.

24 Claims, 8 Drawing Sheets

(56) References Cited

U.S. PATENT DOCUMENTS

| | | | |
|---|---|---|---|
| 2006/0176310 A1* | 8/2006 | Arnaud | G06T 11/40 345/582 |
| 2008/0021679 A1* | 1/2008 | Bleiweiss | A63F 13/00 703/2 |
| 2009/0189890 A1* | 7/2009 | Corbett | G06F 9/505 345/419 |
| 2010/0293248 A1 | 11/2010 | Kamay et al. | |
| 2011/0255791 A1 | 10/2011 | Abdo et al. | |
| 2013/0031482 A1* | 1/2013 | Saul | G06F 3/0488 715/740 |
| 2014/0125649 A1* | 5/2014 | Carlin | G06F 17/30061 345/419 |

* cited by examiner

METHOD AND SYSTEM FOR INTERACTIVE GRAPHICS STREAMING

This application is the U.S. national phase of International Application No. PCT/GB2015/050128 filed 21 Jan. 2015, which designated the U.S. and claims the benefit of U.S. Provisional Application No. 61/929,538 filed 21 Jan. 2014, the entire contents of each of which are hereby incorporated by reference.

FIELD OF INVENTION

The present invention is in the field of interactive graphics streaming. More particularly, but not exclusively, the present invention relates to interactive graphics streaming from an application on a server for display by a GPU on a remote client.

BACKGROUND

In the field of interactive graphics application (such as computer games), users typically download, or obtain by physical media, the applications and execute them locally on their devices.

However, some providers of interactive graphics application desire the flexibility and control of executing the graphics applications at a server and streaming the rendered graphics from the applications to users across a network for display on the user's device.

The existing state of the art in this form of streaming graphics content, execute applications on a specialist server that provides a CPU, memory, backing store and a Graphics Processing Unit (GPU) which is used to render the output of the application into a Framebuffer of pixels. The resulting pixels are then retrieved and encoded into a traditional video stream (e.g. h.264) and sent to the client.

There are a number of disadvantages with this approach. Firstly, the servers have to be extremely powerful to run compute and graphics intensive applications for many users simultaneously; this results in a high power usage (and thus also cooling costs) which are a significant issue in determining business viability.

Second, existing video standards such as h.264 are inherently 'lossy' meaning that they lose image fidelity during encoding. Compression artifacts can be reduced by increasing the bandwidth requirements of the stream, but there is a hard limit on bandwidth into users' premises and a soft limit on the amount of bandwidth out of the datacenter where the servers are co-located. This means these systems have to accept introducing compression artifacts into the content stream to be viable.

Thirdly, the real-time compression of video is a hugely compute intensive process in which the bandwidth requirements of the resultant stream is a function of the amount of compression processing that has been allocated. This adds to the server load and latency of the system.

Fourthly, millions of consumer devices (e.g. tablets, mobiles, and smart TVs) increasingly contain powerful GPUs that are a resource that is largely under utilized when all the applications graphics processing occurs on the server.

Fifthly, display resolutions are increasing rapidly with many devices now offering 2560×1600 pixels and "4k smartTV" (4096 pixel wide displays) arriving soon. A compression system based around pixels (such as h.264) means that to get the fidelity needed for these displays means increasing the bandwidth of the encoded video stream.

Therefore, it would be desirable if an interactive graphics streaming system could be developed where the application is executed on a server and the graphics rendered by a local GPU at the client device.

One such system is described in the article "Low Delay Streaming of Computer Graphics", P Eisert and P Fechteler, 15th IEEE International Conference on Image Processing, ICIP 2008. However, the method described in this article includes shadowing the server memory at the client. This shadowing is bandwidth intensive and shadowing of the entirety of the graphics data may not even be necessary (for example, the resolution limitations of the particular client device may not support high resolution textures).

The MPEG-4 standard describes the transmission of compressed geometry meshes and textures to a remote device and could be adapted to provide an interactive graphics streaming system. However, to implement MPEG-4 for a standalone interactive application would require modifications to the application. Furthermore, the MPEG-4 standard would result in potential retransmission of graphics data from the server to the client for each new stream resulting in inefficient use of bandwidth between server and client.

Therefore, an interactive graphics streaming system is desired which provides improved use of the bandwidth between the server and client, is adaptable to different client device capabilities, and requires minimal or no reprogramming of the interactive graphics application.

It is an object of the present invention to provide a method and system for interactive graphics streaming which meets the above desires while overcomes the disadvantages of the prior art, or at least provides a useful alternative.

SUMMARY OF INVENTION

According to a first aspect of the invention there is provided a method of streaming interactive computer graphics from a server to a client device, including:

a) intercepting graphics instructions transmitted from an application destined for a graphical processing unit (GPU) at the server;

b) processing the graphics instructions to generate graphics data at the server;

c) generating index information for, at least, some of the graphics data at the server;

d) transmitting the index information in place of the graphics data to a client device;

e) extracting corresponding graphics data stored at the client device utilizing the index information; and f) rendering computer graphics at a graphical processing unit (GPU) at the client device using the corresponding graphics data.

The graphics data may include one or more from the set of graphics state, static resources, and dynamic resources.

Objects within the graphics data may be hashed to generate the index information.

The dynamic resources may include a vertex buffer and index information may be generated for modified portions of the vertex buffer. The vertex buffer may be divided into blocks and index information generated for a run of modified blocks. The index information may be generated for a trimmed run of modified blocks such that the run extends from the first modified bit within the first block in the run to the last modified bit within the last block in the run. The vertex buffer may be divided into stripes corresponding to vertex fields and index information generated for modified stripes.

The method of the first aspect may further include the step of synchronizing the graphics data between the server and the client. When the graphics data includes textures, only data for the textures that is used may be synchronized. The profile of the client device may determine the synchronization of graphics data. The profile of the client device may determine the synchronization of graphics data by assigning lower resolution graphics for higher resolution graphics at the client device.

The rendered graphics may be displayed on a display at the client device. The client device may receive user input in response to the displayed graphics, and the user input may be transmitted back to the executing application on the server. The user input may be transmitted, at least in part, using UDP. State Transition Events may be synthesized on the server.

The application may be selected for execution at the server by a user from a plurality of applications According to a further aspect of the invention there is provided a system for streaming interactive computer graphics, including:

a server configured for intercepting graphics instructions transmitted from an application destined for a graphical processing unit (GPU) at the server, processing the graphics instructions to generate graphics data, generating index information for, at least, some of the graphics data, transmitting the index information in place of the graphics data to a client device; and a client device configured for extracting corresponding graphics data stored at the client device utilizing the index information and rendering computer graphics at a graphical processing unit (GPU) at the client device using the corresponding graphics data.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for interactive graphics streaming from a server to a client device.

The system captures output of the application executing on the server and uses semantic-driven compression to enable the output to be rendered locally on the client using its own graphics processing unit (GPU) in real-time. User input on the client device is feed back to the server to enable interaction with the executing application.

Data driving the application and the processing of that data is kept secure on the server while the graphics results are streamed for rendering on the client device.

This enables the client device to utilize its GPU to shift processing cost from the server whilst retaining the security advantages of a client-server architecture.

Figure 1:
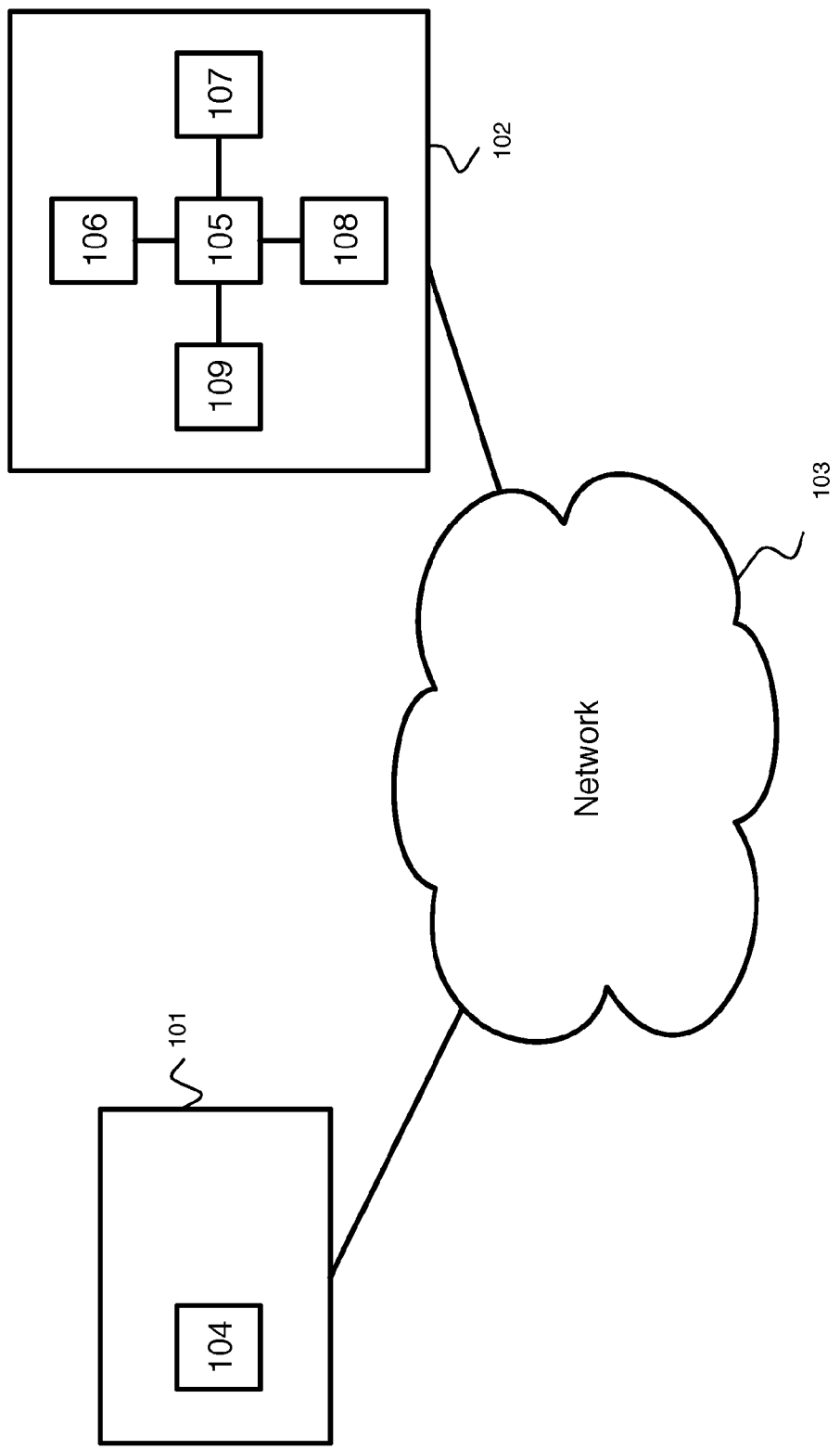
FIG. 1: shows a hardware diagram illustrating a system in accordance with an embodiment of the invention.

In FIG. 1, an interactive graphics streaming system 100 in accordance with an embodiment of the invention is shown.

The system 100 includes a server 101 and at least one client device 102. The server 101 and client devices 102 may communicate via a communications network 103.

The server 101 may include a central processing unit 104 configured to execute an application module, an interceptor module, a processing module, and a communications module.

The client devices 102 may include a central processing unit 105 configured to execute a second processing module, a local storage 106 configured to store index graphics data, and a graphics processing unit (GPU) 107 configured to render graphics. The client devices 102 may also include a user input 108 and a display device 109. The display device 109 may be configured to display the rendered graphics to a user. The client devices 102 may be further configured to receive input from a user in response the displayed graphics and transmit the input to the server 101.

Figure 2:
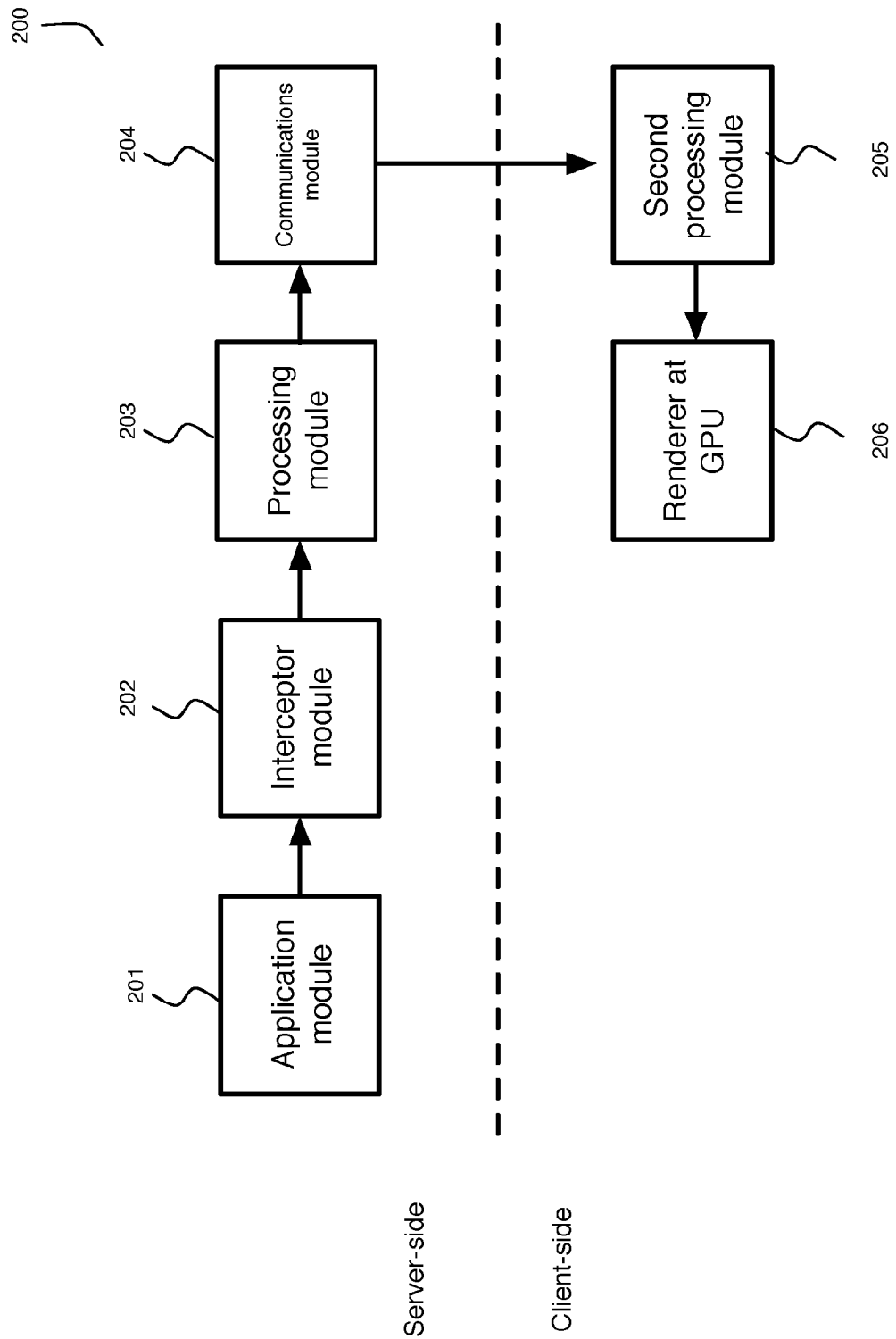
FIG. 2: shows a block diagram illustrating a processing pipeline in accordance with an embodiment of the invention.

In FIG. 2, a graphics processing pipeline 200 in accordance with an embodiment of the invention will be described.

An application module 201 is shown. The application module 201 may be a standard software deployment of an application that generates graphics in response to user input, such as a computer games application.

The application module 201 generates graphics instructions for intended transmission to a local graphics processing unit (GPU).

These instructions may be intercepted by an interceptor module 202, and, therefore, usefully, the application module 201 does not need to be modified to function within an embodiment of the graphics processing system of the present invention.

The interceptor module 202 may divert all these instructions to a processing module 203. Therefore, the apparatus executing the application module 201 does not require, or is not required to use, a graphic processing unit (GPU).

The processing module 203 may process the graphics instructions to generate graphics data, such as graphics state, static resources or dynamic resources.

The processing module 203 may then utilize this graphics data to generate index information.

The index information may be transmitted via a communications module 204 to a remote device.

A second processing module 205 at the remote device may receive this index information and retrieve from local storage at the remote device graphics data corresponding to the index information.

This graphics data may be utilized by a renderer 206 at a graphics processing unit (GPU) at the remote device to render graphics.

Figure 3:
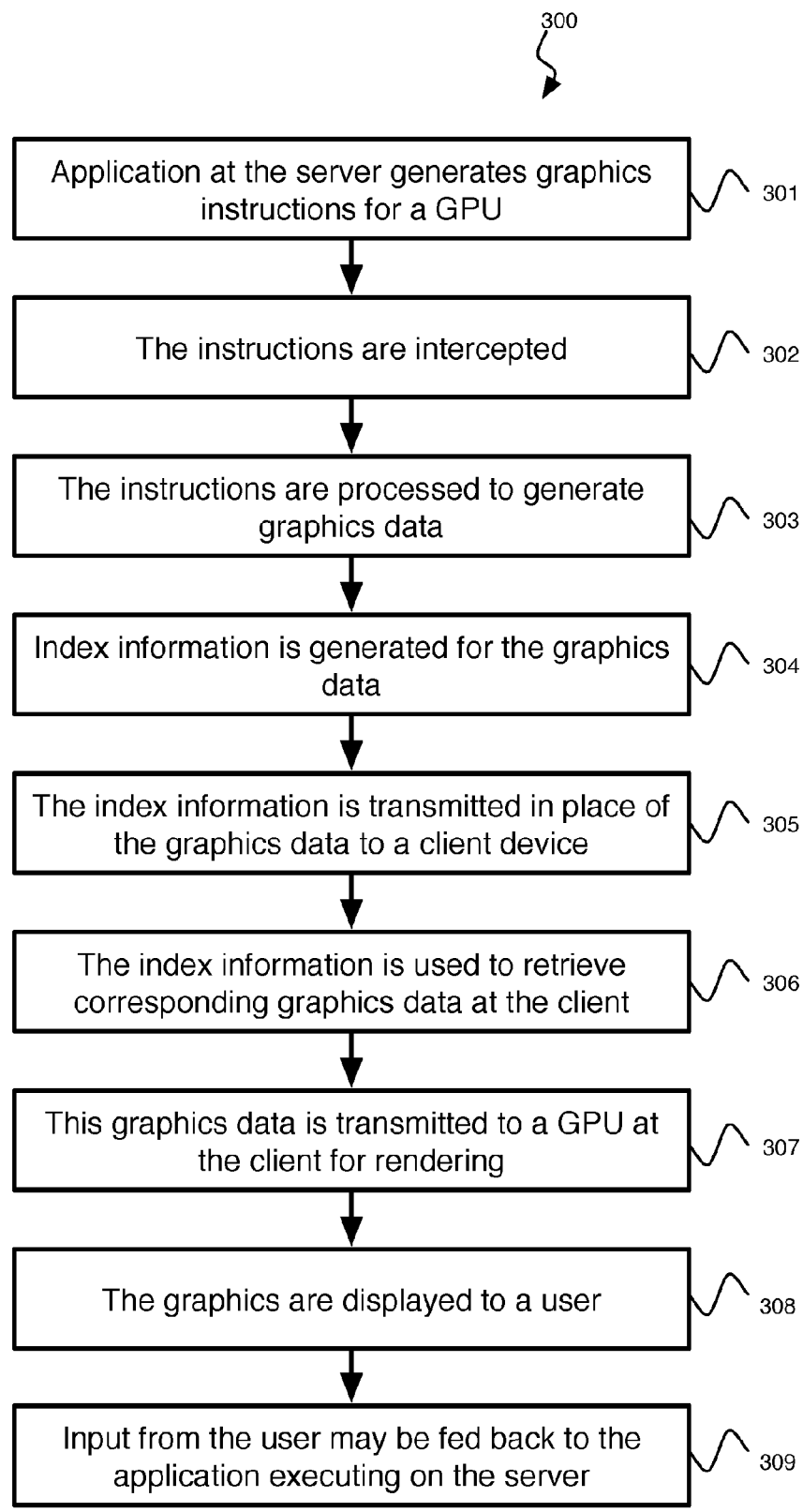
FIG. 3: shows a flow diagram illustrating a method in accordance with an embodiment of the invention.

In FIG. 3, a method 300 of streaming interactive graphics from a server to a client device will be described.

In step 301, an interactive graphics application executing on a server generates graphics instructions for a graphical processor unit (GPU).

In step 302, these instructions are intercepted, for example, by an interceptor module.

In step 303, these intercepted instructions are processed, for example by a processing module, to generate graphics data. The graphics data may include graphics state, static resources, and/or dynamic resources.

In step 304, index information is generated for the graphics data. For example, objects within the graphics data may be hashed to generate a hash code.

In one embodiment, where the dynamic resource is a vertex buffer, the vertex buffer may be partitioned and hashed to reduce unnecessary retransmission of the entire vertex buffer following a change. For example, the vertex buffer may be divided into blocks and a hash generated for each run of modified blocks. The run of blocks may be trimmed run of blocks such that the hash is generated from the first change in the first block of the run to the last change within the last block of the run.

In step 305, this index information is transmitted in place of the graphics data to a client device.

In step 306, the index information is used to retrieve corresponding graphics data at client device.

In step 307, this graphics data is transmitted to a graphical processing unit (GPU) at the client device to render the graphics.

In step 308, the graphics may be displayed to a user.

In step 309, the user may provide input which is fed-back to the executing interactive graphics application on the server.

In one embodiment, the method further includes the step of synchronizing graphics data between the server and the client device. During synchronization, only a portion of the graphics data may be transmitted. For example, mipmaps may be deleted from the graphics data before transmission and regenerated at the client, reduced resolution textures may be sent in place of high resolution textures based on the resolution capabilities of the client device, and actually utilized texture data may be transmitted to the client device.

With reference to FIGS. 4 to 8, one embodiment of the present invention will be described.

This embodiment permits a server to offer a plurality of applications that can be invoked remotely from a client device. The application logic runs on the server and the graphical output of the application is streamed to the client device over the internet for local rendering.

It will be appreciated that the various features described in relation to this embodiment could be all be implemented to deliver the system or could be implemented in part to deliver a potentially less effective system.

Figure 4:
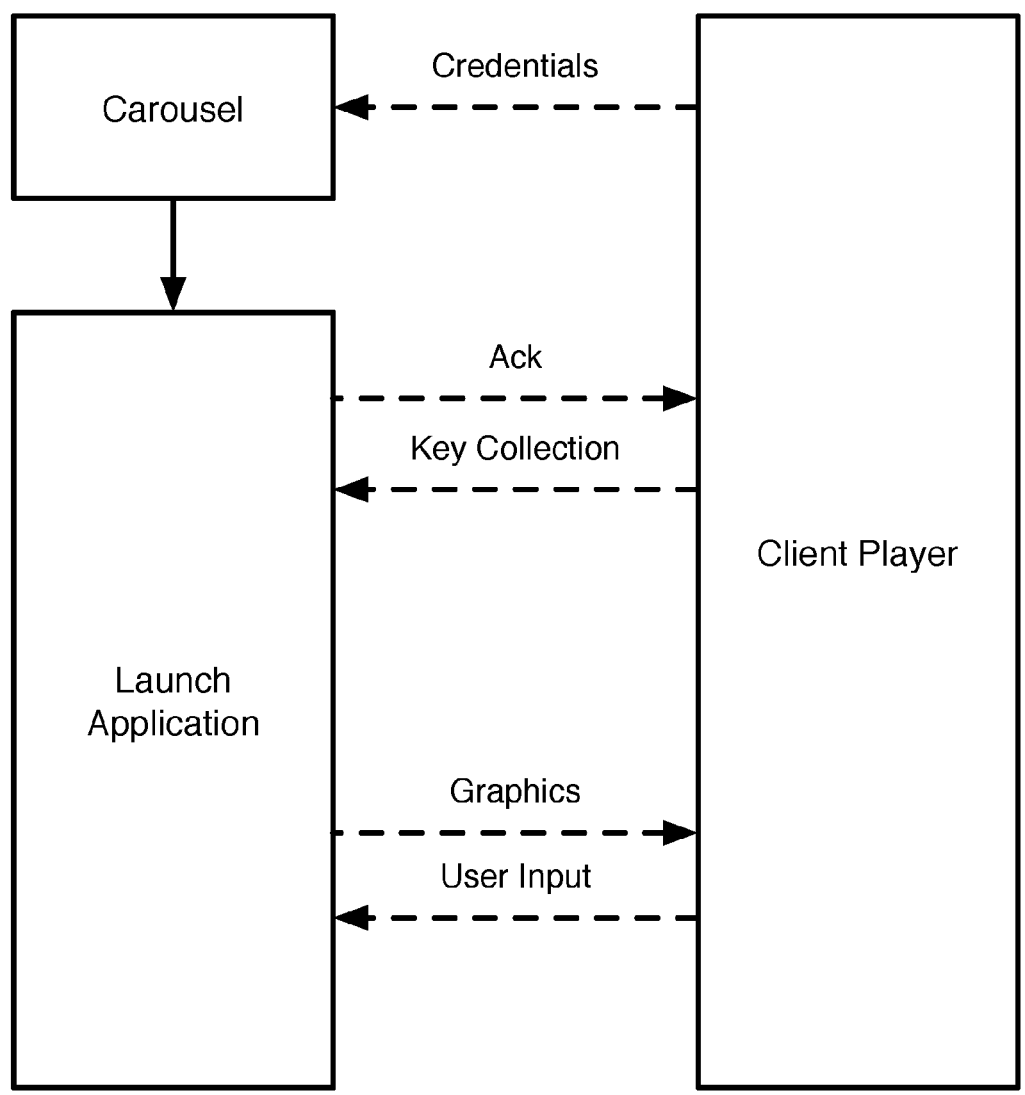
FIG. 4: shows a block diagram illustrating interaction between the client player and server in accordance with an embodiment of the invention.

As shown in FIG. 4, the process starts with a client Player app being run on the client device (PC, tablet, smart TV, mobile). This Player app connects using TCP/IP to a "Carousel" running on the server which offers the applications currently available. An application is chosen and a session is launched for the client with the TCP connection handed-off to the launched application so it can continue to communicate with the client.

This embodiment requires lossless communication in the downstream. Therefore, TCP or lossless UDP protocols may be advantageously used for downstream communication and (lossy but low-latency) UDP protocol may be used for upstream client input communication. The upstream client input such as locator device, keyboard, joystick may be all sent in an "absolute form" with actual "State Transition Events" being synthesized on the server for the running application. This approach may permit UDP packets to be dropped without missing potentially important State Transition Events that change application behaviour. For example mouse move with a button pressed rather than mouse move without a button pressed.

Figure 5:
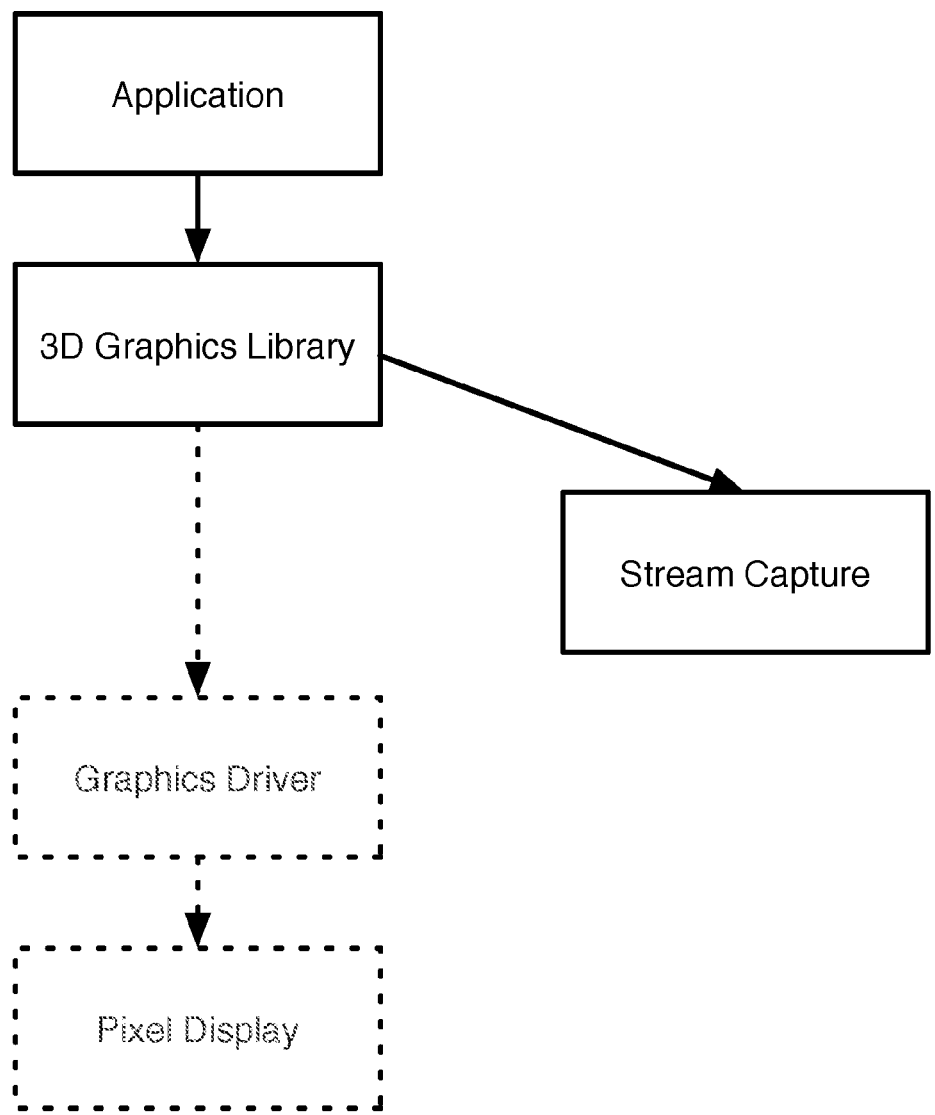
FIG. 5: shows a flow diagram illustrating interception of graphics instructions in accordance with an embodiment of the invention.

In normal operation, the side effect of an application calling a 3D graphics driver would be the calculation of pixels written into a Framebuffer and displayed. As shown in FIG. 5, the process of this embodiment works by interposing on an existing application running on a server with a proxy that directs the graphics command stream and all associated resources to the system of the present invention.

The proxy manages transmission of the data to a remote client device where it is rendered and the current image created.

The amount of data flowing from the application to the 3d graphics system is typically substantial and may be difficult to deliver to a remote client without resorting to the semantic-driven compression process described below.

This embodiment of the present invention works by leveraging knowledge of what the data flowing from application to graphics system represents and how it can be handled in an efficient manner. This data stream can viewed as for Extending state, Evolving state and Side Effects (typically GPU commands) on the remote device.

This embodiment makes the observation that while frames are being generated at 30 Hz, the Working Set of graphics assets evolves at a more modest speed because there is typically geometric inter-frame coherence. It is also observed by the inventor that because the data stream is generated by an application that has—at some level of granularity—a fixed dispatch sequence, this can be used to avoid transmission of data previously sent to the client device.

When a Client connects to the service, as part of the handshaking protocol it gives the server:

A Client Profile detailing its graphics capabilities and requested resolution. These graphics capabilities are used to ensure the Proxy emulates what the client is able to perform.

A Hash Key Collection where each key uniquely identifies a blob of data the client has cached locally. This cache can be populated by previous sessions, speculatively from a CDN (Content Delivery Network) or from removable media such as USB sticks.

Figure 6:
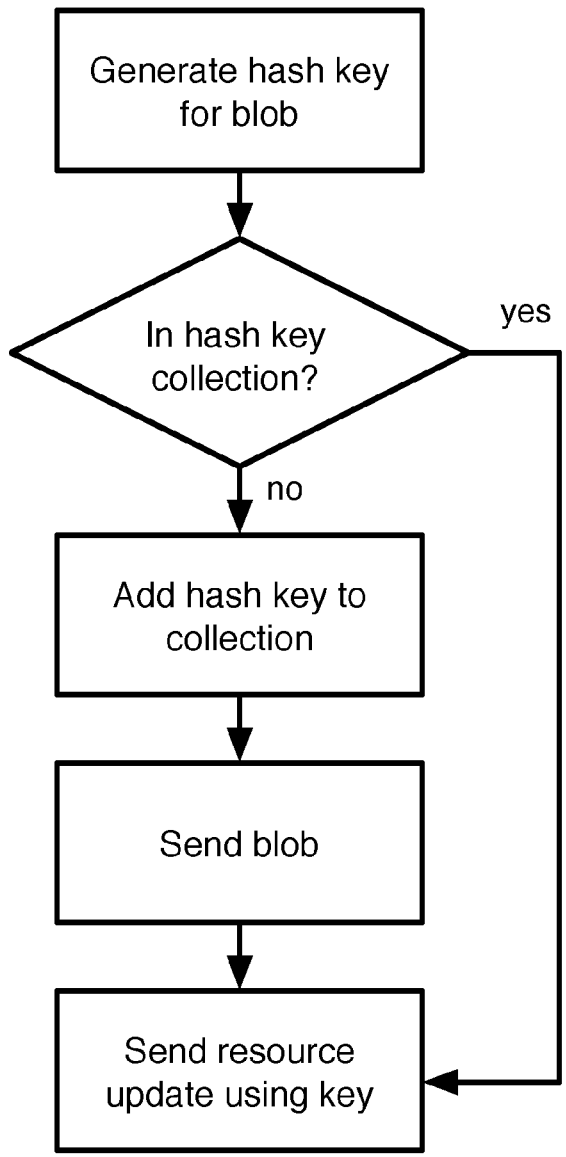
FIG. 6: shows a flow diagram illustrating creation of the hash key collection in accordance with an embodiment of the invention.

The Hash Key Collection ensures that the server will always use a hash key (also known as a data digest) rather than resending data thus reducing the bandwidth requirements. The general technique is shown in FIG. 6.

The hash key is generally much smaller than the data it represents, being typically a 64 or 128 bit key. However bandwidth may be further reduced by keeping a small additional cache (e.g. 256 entries) of indexes to recently used hash keys to data blobs. This allows the "Send Resource Update" command to be reduced in size.

Graphics Commands

Figure 7:
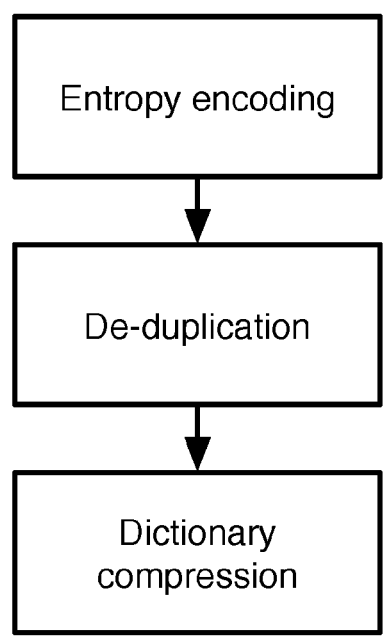
FIG. 7: shows a flow diagram illustrating graphics command compression in accordance with an embodiment of the invention.

Graphics commands are captured as they are issued by the application and procrastinated until as late as possible before being coded using a lossless entropy encoding such as Huffmann, de-duplicated with respect to the client historical graphics commands and compressed using a sliding window dictionary as shown FIG. 7.

The trigger for emitting the command stream is the appearance of a Side Effect command such a Draw command or Frame End command at which point all relevant state that has been changed by the application is resolved to ensure it is synchronized on the remote device.

The amount of data a frame of application graphics commands requires, while clearly application-dependent, is typically low because the graphics commands (but not necessarily the graphics parameters) used in the current frame are very similar to the graphics commands of the previous frame.

Resolving Changed State

There are a number of types of state used in real-time graphics and each one may be handled differently:

Graphics State
    Static Resources
    Dynamic Resources

Graphics State

Graphics state encompasses all state that controls the operation of the client graphics system. It includes RenderState and miscellaneous fixed-function controls (for example Viewport size, Framebuffer clearing color) as well as Shaders and their Constants. These are handled by aggressively shadowing server-client state to reduce unnecessary transmission as well as packing common renderstate bursts used by graphics applications into custom codes—for example, almost all graphics programs when establishing a new texture to use, also set the minification and magnification filtering as well as wrapping modes. All of these can be compressed into a single low-overhead command. Shader Constants (also known as Uniforms) are the method by which a graphics application parameterizes its shader code. It is presented to the application as a linear register file of N 4-tuples where N is typically >128. This register file is used in any way the application sees fit, meaning this embodiment of the present invention needs to process this file carefully to ensure the entire register file is not transmitted every time a shader is used, for example. A number of processes can be applied to reduce bandwidth:

Identify commonly used values such as 0.0 and 1.0
    Lossy recoding to lower precision (for example HalfFloat and ranged Integers)
    Shadowing register file per shader to reduce thrashing.
    Run length encoding changes Static Resources The lifecycle of static resources is such that once created, they are simply referenced as part of the graphics processing until they are no longer needed, at which point they are disposed.

For static assets this works in a straightforward manner because any reading/writing to an asset made by the application can be interposed and the hashed contents can be checked against the Hash Key Collection.

As part of the standard 3d graphics APIs (Application Programming Interface), when interacting with graphics resources, the application must provide flags indicating its intention. These flags are used by the regular graphics drivers to optimize performance on the local machine.

In this embodiment, the flags may be repurposed to help identify resources that are likely to be unchanging. In the current embodiment, if a resource is flagged "WRITE_ONLY" and has touched all the memory of that resource, it can be surmised to be a static resource—for example a static geometry mesh. This can be hashed, the Hash Key Collection checked and optionally delivered to the client device.

Shader code is always static and the Hash Key Collection probed as described above. Client devices use different languages for shaders so automated shader translation functionality may be used on the server to convert shaders written in HLSL into GLSL before hashing.

Likewise, Vertex Declarations describe the layout of Vertex buffers and are static.

Textures in the vast majority are also static assets but pose the problem that they are large resources. The current embodiment mitigates this by:

Only transmitting the textures that are actually used. A further refinement may be to identify the portion of a texture that is actually used by examining the geometry texture coordinates which specify the region of the texture atlas to map.
    Controlling the capabilities of the Proxy graphics driver to reduce the apparent maximum texture size that will be accepted from the application. This leverages the fact that graphics applications are designed to run on a wide range of performance profiles with it being a general requirement that the application can vary fidelity based on the features and performance of the users' graphics drivers. By varying the proxy driver capabilities, the application can be indirectly controlled.
    Identifying textures where mipmaps can be generated on the client from the top-level texture thus reducing by 33% the amount of data being sent. A further refinement may be to gather data from previous play sessions that determine which mipmaps of a texture are actually used. It is not uncommon for 3d content to have textures that are much higher resolution than required for the resolution that they are being run at.
    Use the Hash Key Collection to substitute lower resolution assets better matched to the client device capabilities. This may be driven off the client profile and performed on a per-application basis.

Dynamic Resources

As well as static resources, 3d applications often have resources that evolve over time and these pose a challenge to a bandwidth restricted client device. The most common dynamic edits to resources is with a special buffer contain geometric information called a Vertex Buffer. The format of this Vertex Buffer is flexible and is defined by a previously declared Vertex Declaration which describes the different fields and offset of the Vertex Buffer so that graphics hardware can interpret the data.

Resources that are dynamically updated by the application use a Lock/Unlock paradigm to ensure that the consumer of the data, the graphics hardware and producer of the data, the application, do not conflict.

It is common for 3d applications to Lock a Vertex Buffer containing geometry, make a change and then use that data to draw some element of the display. The Lock API generally provide parameters for indicating which part of the Vertex Buffer will be edited, however, these are often set by applications to the entire buffer because the "contract" the application makes with a Lock operation is simply that it guarantees not to change data that is being used by the graphics hardware.

This problem may be solved by introducing a HashedBlockBuffer process between the application and VertexBuffer. As with other parts of this invention, information about how to process the Vertex Buffer from prior structures that have been declared as well as empirical knowledge about how Vertex Buffers are used in practice may be leveraged.

The HashedBlockBuffer segments the Vertex Buffer into fixed length blocks. In the current embodiment, 1024 byte blocks are used, but this can be tuned for performance reasons. Each block tracks whether it is "dirty" (has been changed and therefore will need synchronization with the client device), whether it can be "cleaned" (having been synchronized, can the application ever overwrite the data) and within the dirty block where the change begins.

This meta-data for each block is accumulated as the application performs Lock-Edit-Unlock operations. At the point when the data must be resolved because it is about to be used by a draw command, the client device must be in synchronization with the server.

In order to ensure a match is obtained within the Hash Key Collection, the same runs of changed data must be precisely identified. Identifying inclusive runs will yield a different hash and therefore not allow avoidance of sending large amounts of data. The current embodiment uses runs of dirty blocks to identify regions needing updating.

These regions are further refined by using the start on the first block and the end for the last block where data differs to produced a "trimmed run of dirty blocks". Additionally the Vertex Declaration that is currently in effect to ensure the data is treated at the correct granularity is used—that is hashing is not started in the middle of a Vertex structure because the first few bytes happened not to differ. By using the Vertex Declaration this embodiment steps back to the beginning of an integral vertex and finishes at the end of an integral vertex.

The next problem is that it is common, indeed encouraged, for graphics applications to interleave different vertex data types in a Vertex Buffer. However, it is also common, not to update all fields of a vertex. For example the vertex color and vertex texture coordinates may be constant but the position of the vertex is being changing.

A (pseudo-code) Vertex Declaration might look like this:

| Offset | Usage | Type |
|---|---|---|
| 0 | POSITION | FLOAT3 |
| 12 | COLOR | UBYTE4 |
| 16 | TEXCOORD | FLOAT2 |

While the trimmed run of dirty blocks could be hashed and such an embodiment of the system will run, bandwidth may be reduced further by using the Vertex Declaration in an operation to process the trimmed run of dirty blocks on a per stripe basis.

| Vertex Buffer | Position hash | Color hash | Texcoord hash |
|---|---|---|---|
| POSITION | POSITION | | |
| COLOR | | COLOR | |
| TEXCOORD | | | TEXCOORD |
| POSITION | POSITION | | |
| COLOR | | COLOR | |
| TEXCOORD | | | TEXCOORD |
| POSITION | POSITION | | |
| COLOR | | COLOR | |
| TEXCOORD | | | TEXCOORD |
| POSITION | POSITION | | |
| COLOR | | COLOR | |
| TEXCOORD | | | TEXCOORD |
| POSITION | POSITION | | |
| COLOR | | COLOR | |
| TEXCOORD | | | TEXCOORD |

That is, the system may stride through the vertex buffer (optionally compressing) and hashing like-typed data together so that in this example the system generates 3 hashes for the 3 fields each vertex has. The result is that the system will get a hit in the Key Collection for the COLOR stripe and TEXCOORD stripe and not need to send these to the client device. The changing vertex positions will need to be sent if, and only if, the system has not seen these vertex positions before. For cyclic animations for example this will quickly populate the Key Collection with hashes that match.

Buffer Re-use

In the current embodiment, the system interposes on the Microsoft DirectX 3d graphics API and leverages the additional semantic insight obtained from the flag parameters provided when the application Locks a Vertex Buffer and the "best-practice" calling sequence encouraged by Microsoft.

The common use-case for Vertex Buffer Locking is to incrementally fill a buffer with dynamically generated geometry until it is full and then start again at the beginning. In order to ensure that the graphics hardware can continue to operate at full speed, the graphics API introduces 2 additional flags for the application: NO_OVERWRITE and DISCARD.

NO_OVERWRITE means the application makes a promise never to overwrite any data in the buffer it has previous written. The reason for this promise is that the graphics hardware can be confident in using memory mapping, direct memory access (DMA) or any other means to access this data and guarantee it is not stale.

DISCARD means the application indicates the buffer is "write once" and will never be subsequently read from. The reason for this promise is it allows the graphics hardware to continue operating on the existing buffer while the application fills a new buffer and when it is Unlocked, silently swap the buffers inside the driver and dispose of the other buffer knowing it will never be needed again.

Application developers are encouraged to use these 2 flags together by incrementally filling a NO_OVERWRITE buffer with graphics data, drawing some portion of it. When they reach the point of not being able to fit any more data in the buffer, they Lock with a DISCARD flag, and start filling from the start of the buffer again. This system allows the graphics hardware to operate at maximum efficiency.

Figure 8:
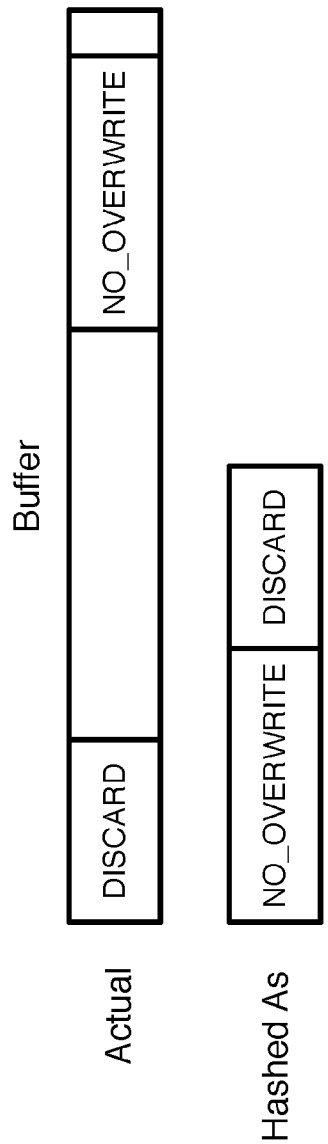
FIG. 8: shows a block diagram illustrating hashing of vertex buffer blocks in accordance with an embodiment of the invention.

As shown in FIG. 8, this embodiment of the invention leverages this knowledge to identify when the system detects a short dirty run of blocks at the beginning of a DISCARD buffer following the same buffer being locked for OVERWRITE is highly likely to be related. This short dirty run of blocks in the DISCARD buffer will likely not match the Hash Key Collection and require sending.

Therefore, the new DISCARD buffer run can be treated as a continuation of the previous run at the end of the buffer to ensure a Hash Key Collection match.

Potential advantages of some embodiments of the present invention are that:

a) Specialist, power-hungry GPUs are not required on the servers and so generic servers can be used. This in turns means the number of users per server can be higher thus reducing running costs.

b) The invention may be resolution independent and can be played back at high resolution without increasing stream bandwidth requirements unlike pixel-based video compression.

c) The bandwidth requirement can be extremely low (<1 Mbs) for some applications running at high resolution because compression that leverages knowledge about what is being compressed is relied on.

d) The invention may require no changes to the existing application executable, and thus requires no access to source code for modification so can be used on existing and legacy software.

e) Arbitrary new Content can be injected into the stream in real-time to re-purpose it for new devices and platforms. For example overlays for virtual buttons when running on tablets can be created, banner advertisements around the content can be introduced, and images to insert advertising inside a video game's virtual world can be replaced.

f) Fine-grain resource usage information from users can be collected to help refine where assets are kept on the CDN (Content Delivery Network) as well as removing redundant data from the stream for future users.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method of streaming interactive computer graphics from a server to a client device, including:
   executing, at the server, an application generating graphics instructions for a graphical processing unit (GPU) in the server;
   intercepting, at the server, the generated graphics instructions transmitted from the application;
   processing, at the server, the intercepted graphics instructions to generate graphics data;
   during the execution of the application generating further graphics instructions, synchronizing a portion of the generated graphics data and graphics data stored at the client device without transmitting all of the generated graphics data to the client device, wherein the synchronization is performed based on a profile of the client device identifying graphics capabilities of the client device;
   generating, at the server, index information for, at least, some of the generated graphics data;
   transmitting the index information in place of the at least some of the generated graphics data to the client device;
   extracting, at the client device, corresponding graphics data stored at the client device utilizing the index information; and
   rendering computer graphics at a graphical processing unit (GPU) at the client device using the extracted corresponding graphics data.

2. A method as claimed in claim 1, wherein the graphics data includes one or more from the set of graphics state, static resources, and dynamic resources.

3. A method as claimed in claim 2, wherein the dynamic resources include a vertex buffer.

4. A method as claimed in claim 3, wherein the index information is generated for portions of the vertex buffer.

5. A method as claimed in claim 4, wherein the vertex buffer is divided into blocks and index information is generated for a run of the blocks.

6. A method as claimed in claim 3, wherein the vertex buffer is divided into stripes corresponding to vertex fields and the index information is generated for the stripes.

7. A method as claimed in claim 1, wherein objects within the graphics data are hashed to generate the index information.

8. A method as claimed in claim 1, wherein the generate graphics data includes low resolution textures and high resolution textures, and only one of the low resolution textures and the high resolution textures is transmitted to the client device based on the profile of the client device.

9. A method as claimed in claim 1, wherein, when the graphics data includes textures, only textures, of the textures included in the graphics data, that are used in rendering computer graphics at the client device GPU are synchronized.

10. A method as claimed in claim 1, wherein the profile of the client device includes resolution requested by the client device, and the portion of the generated graphics data which is synchronized is determined based on the resolution requested by the client device.

11. A method as claimed in claim 10, wherein the synchronizing includes transmitting lower resolution graphics in place of higher resolution graphics included in the generated graphics data.

12. A method as claimed in claim 1, wherein the rendered computer graphics are displayed on a display at the client device.

13. A method as claimed in claim 12, wherein the client device receives user input in response to the displayed computer graphics, and the user input is transmitted back to the executing application on the server.

14. A method as claimed in claim 13, wherein the user input may be transmitted, at least in part, using User Datagram Protocol (UDP).

15. A method as claimed in claim 14, wherein State Transition Events are synthesised on the server.

16. A method as claimed in claim 1, wherein the application is selected for execution at the server by a user from a plurality of applications.

17. The method of claim 1, wherein the graphics data stored at the client device includes a portion of graphics data received from the server and graphics data generated at the client device.

18. The method as claimed in claim 1, wherein the portion of the generated graphics data and graphics data stored at the client device is synchronized upon the generated graphics instructions satisfying a predetermined condition.

19. A method of streaming interactive computer graphics from a server to a client device, including:
   intercepting, at the server, the graphics instructions transmitted from an application destined for a graphical processing unit (GPU) at the server;
   processing, at the server, the intercepted graphics instructions to generate graphics data, the generated graphics data including dynamic resources with a vertex buffer divided into blocks;
   generating, at the server, index information for at least some of the generated graphics data, wherein the index information is generated for a trimmed run of the blocks such that the trimmed run extends from a first modified bit within a first block in the trimmed run to a last modified bit within a last block in the trimmed run;
   transmitting the index information in place of the at least some of the generated graphics data to the client device;
   extracting, at the client device, corresponding graphics data stored at the client device utilizing the index information, wherein the at least a portion of the stored graphics data is received from the server; and rendering computer graphics at a graphical processing unit (GPU) at the client device using the extracted corresponding graphics data.

20. A system for streaming interactive computer graphics, including:
- a client device; and
- a server configured for:
  - executing an application generating graphics instructions for a graphical processing unit (GPU) in the server,
  - intercepting the generated graphics instructions transmitted from the application, processing the intercepted graphics instructions to generate graphics data,
  - during the execution of the application generating further graphics instructions, synchronizing a portion of the generated graphics data and graphics data stored at the client device without transmitting all of the generated graphics data to the client device, wherein the synchronization is performed based on a profile of the client device identifying graphics capabilities of the client device,
  - generating index information for, at least, some of the generated graphics data, and
  - transmitting the index information in place of the at least some of the generated graphics data to the client device;
- wherein the client device is configured for extracting corresponding graphics data stored at the client device utilizing the index information and rendering computer graphics at a graphical processing unit (GPU) at the client device using the extracted corresponding graphics data.

21. A server configured for use with the system of claim 20.

22. A client device configured for use with the system of claim 20.

23. The system of claim 20, wherein the generated graphics data includes dynamic resources with a vertex buffer divided into blocks, generating the graphics data includes modifying at least some of the block previously generated, and the index information is generated for the modified blocks.

24. A system for streaming interactive computer graphics, including:
- a client device; and
- a server configured for: executing an application generating graphics instructions for a graphical processing unit (GPU) in the server, intercepting the generated graphics instructions transmitted from the application, processing the intercepted graphics instructions to generate graphics data, synchronizing a portion of the generated graphics data and graphics data stored at the client device without transmitting all of the generated graphics data to the client device, wherein the synchronization is performed based on a profile of the client device identifying graphics capabilities of the client device, generating index information for, at least, some of the generated graphics data, and transmitting the index information in place of the at least some of the generated graphics data to the client device;
- wherein the client device is configured for extracting corresponding graphics data stored at the client device utilizing the index information and rendering computer graphics at a graphical processing unit (GPU) at the client device using the extracted corresponding graphics data, wherein the graphics data stored at the client device includes a portion of graphics data received from the server and graphics data generated at the client device based on information generated at the server.

* * * * *